United States Patent
Greiner-Jacob et al.

(10) Patent No.: US 9,864,721 B2
(45) Date of Patent: Jan. 9, 2018

(54) CASCADED FIELDBUS SYSTEM

(71) Applicant: Siemens Aktiengesellschaft, Munich (DE)

(72) Inventors: Ralf Greiner-Jacob, Egloffstein (DE); Harald Seeburg, Ursensollen (DE)

(73) Assignee: Siemens Aktiengesellschaft, Munich (DE)

( * ) Notice: Subject to any disclaimer, the term of this patent is extended or adjusted under 35 U.S.C. 154(b) by 278 days.

(21) Appl. No.: 14/438,674

(22) PCT Filed: Nov. 6, 2012

(86) PCT No.: PCT/EP2012/071936
§ 371 (c)(1),
(2) Date: Apr. 27, 2015

(87) PCT Pub. No.: WO2014/071970
PCT Pub. Date: May 15, 2014

(65) Prior Publication Data
US 2015/0261717 A1    Sep. 17, 2015

(51) Int. Cl.
*G06F 13/42* (2006.01)
*G05B 19/418* (2006.01)
*G06F 9/455* (2006.01)

(52) U.S. Cl.
CPC ..... *G06F 13/4265* (2013.01); *G05B 19/4185* (2013.01); *G06F 9/45533* (2013.01); *Y02P 90/18* (2015.11); *Y02P 90/185* (2015.11)

(58) Field of Classification Search
CPC ............ G06F 13/4265; G06F 9/45533; G05B 19/4185; Y02P 90/18; Y02P 90/185
See application file for complete search history.

(56) References Cited

U.S. PATENT DOCUMENTS 6,701,377 B2 * 3/2004 Burmann ................ H04L 12/66
                                                            709/230
2002/0042845 A1    4/2002 Burmann et al.
(Continued)

FOREIGN PATENT DOCUMENTS

DE    197 39 297 A1    3/1999

OTHER PUBLICATIONS

PI Working Group WG9, "CANopen Integration in PROFINET IO: Amendment 7 to Fieldbus Integration into PROFINET IO Guideline", Mar. 2011, Version 1.0, pp. 1-28.*
(Continued)

*Primary Examiner* — Henry Tsai
*Assistant Examiner* — John Roche
(74) *Attorney, Agent, or Firm* — Harness, Dickey & Pierce, P.L.C.

(57) ABSTRACT

For simplified projection of a cascaded fieldbus system which includes a first fieldbus with a plurality of first bus devices, a second fieldbus subordinate to the first fieldbus with a plurality of second bus devices and a third fieldbus subordinate to the second fieldbus with a plurality of third bus devices, an example embodiment of the invention provides that the second fieldbus is connected to the first fieldbus via a fieldbus access node device, and therefore bus devices of the second fieldbus are presented as virtual modules of the first fieldbus, and that a connection device, via which the third fieldbus is connected to the second fieldbus, is presented as a virtual fieldbus access node module of the first fieldbus, and therefore the remaining bus devices of the third fieldbus are presented as virtual modules of the first fieldbus.

16 Claims, 2 Drawing Sheets

(56) References Cited

U.S. PATENT DOCUMENTS

2008/0313254 A1 12/2008 Hilemon et al.
2009/0248941 A1* 10/2009 Morein ............... G06F 13/4265
                                                            710/308
2012/0102240 A1* 4/2012 Wei ....................... H04L 12/403
                                                            710/30

OTHER PUBLICATIONS

J. Jasperneite, "PROFINET: An Integration Platform for heterogeneous Industrial Communication Systems"; 10th IEEE International Conference on Emerging Technologies and Factory Automation, IEEE, Piscataway, NJ; vol. 1; pp. 815-822; ISBN: 978-0/7803-9401-8; DOI: 10.1109/ETFA.2005.1612610; XP010905415; 2005; US; Sep. 19, 2005.

"Fieldbus integration in POFINET IO, Version 2.0"; URL: http://www.felser.ch/download/index.htm?7_profinet.htm; pp. 1-37; XP055068005; 2011.

"CANopen Integration in PROFINET IO—Amendment 7 to Fieldbus Integration into PROFINET IO—Version 1.0"; URL: http://www.felser.ch/download/index.htm?7_profinet.htm; pp. 1-28; XP055068008; 2011.

International Search Report PCT/ISA/210 for International Application No. PCT/EP2012/071936 dated Jun. 25, 2013.

Written Opinion of the International Searching Authority PCT/ISA/237 for International Application No. PCT/EP2012/071936 dated Jun. 25, 2013.

International Preliminary Report on Patentability for International Application No. PCT/EP2012/071936 dated Oct. 13. 2014.

* cited by examiner

CASCADED FIELDBUS SYSTEM

PRIORITY STATEMENT

This application is the national phase under 35 U.S.C. §371 of PCT International Application No. PCT/EP2012/071936 which has an International filing date of Nov. 6, 2012, which designated the United States of America, the entire contents of which is hereby incorporated herein by reference.

FIELD

At least one embodiment of the invention generally relates to a cascaded fieldbus system. A facility with several fieldbuses connected in a communicative fashion to one another, which are arranged in a hierarchy defined by specific dominant or subordinate ratios, is referred to as a cascaded fieldbus system. This hierarchy is also referred to as "cascade".

BACKGROUND

Fieldbuses are used in the industrial field for communication purposes, i.e. for the exchange of commands and data between several bus devices. The bus devices in a fieldbus typically involve at least one control device and at least one device to be controlled, in particular a sensor and/or actuator. A fieldbus includes a wired or wireless data transmission path of a specified type, in particular a specific copper or glass fiber line, by way of which all bus devices of the fieldbus are connected to one another in a predetermined topology (e.g. ring topology, star topology, line topology or tree topology) for the exchange of commands and data. Furthermore, a fieldbus usually includes a number of bus interfaces, wherein a bus interface is assigned in each instance to each of the bus devices. A standardised protocol which is implemented in the bus interfaces forms the basis of each fieldbus, according to which protocol the bus devices communicate with one another.

In order to enable a targeted communication between two specific bus devices or a larger subgroup of the bus devices, a unique address is usually assigned to each bus device in the case of a fieldbus. The addressing of the bus devices is also frequently used to regulate bus access. The bus devices of a fieldbus are in most instances in a master/slave configuration, wherein at least one bus device as a "master" can access the bus line and transfers data to the remaining bus devices ("slaves") or reads in data from these remaining bus devices.

The communication of modern fieldbus standards is frequently based on the Ethernet standard. Such fieldbuses are also referred to as "Industrial Ethernet", "Real-time Ethernet" or "Second generation fieldbuses". Widespread second generation fieldbus standards are in particular Profinet, Ethernet/IP (EIP), EtherCAT, etc.

Fieldbuses, whose communication is not based on the Ethernet standard, are by contrast referred to as "First generation fieldbuses". Widespread first generation fieldbus standards are in particular Profibus, CAN, CANopen, Interbus etc.

Bus devices of modern fieldbuses are furthermore frequently designed to be modular. Such bus devices comprise a number of separately addressable slots, which can optionally be occupied with plug-in card modules with varying functions.

In industrial systems, such as for instance manufacturing plants and power plants, fieldbuses can be highly complex. It may herewith be necessary or at least economically useful, for instance in the course of extending existing systems or integrating subsystems from various manufacturers, to connect several different fieldbuses to form one fieldbus system. Such a fieldbus system is frequently structured in a cascaded manner. It correspondingly includes a dominant fieldbus (first order fieldbus), from which at least one directly subordinate fieldbus (second order fieldbus) is actuated. One or a number of further fieldbuses (fieldbus of an n'th order; $n=3, 4, 5, \ldots$) can in turn be directly or indirectly subordinate to the or each fieldbus of the second order.

Disadvantageously the programming of such a cascaded bus system is however frequently highly complex, especially the bus devices of the subordinate fieldbuses are not visible for the fieldbus of the first order and the control device thereof. This regularly results in each fieldbus having to be programmed separately. A central controller of the bus devices of the subordinate fieldbus via the fieldbus of the first order can generally only be established with precise knowledge of all subordinate fieldbuses.

To simplify the project planning of complex fieldbus systems, "Profinet IO" so-called fieldbus access points (FAP) are provided in the fieldbus standard, by way of which further fieldbuses can be connected. Each fieldbus access node herewith spans a so-called slot cluster. Such a slot cluster contains a number of virtual slots, to which bus devices of the subordinate bus can be assigned. This assignment allows the bus devices of the subordinate bus to be presented as virtual modules of the Profinet bus. They are thus shown in the communication and address scheme of the Profinet bus as if these bus devices were physical modules of the Profinet bus. In particular, the bus devices of the subordinate fieldbus can also be addressed and responded to directly from the Profinet bus via the assigned virtual module. This concept of integrating subordinate fieldbuses is in particular described in the guideline "Fieldbus Integration in PROFINET IO", Version 2.0 (May 2011), No.: 7.012, PROFIBUS Nutzerorganisation e.V., Karlsruhe (Germany).

The afore-described concept can nevertheless only be applied to fieldbuses which are directly subordinate to a Profinet bus as a fieldbus of the second order. By contrast, the bus devices of fieldbuses of the third order, fourth order, etc., which are only connected indirectly to the Profinet bus, cannot be presented.

SUMMARY

At least one embodiment of the invention includes a cascaded fieldbus system with at least three orders (cascade levels), in other words three fieldbuses placed in a hierarchy.

At least one embodiment is directed to a method for the project planning of a cascaded fieldbus system. At least one embodiment is directed to a cascaded fieldbus system. At least one embodiment is directed to a fieldbus module or fieldbus device. Advantageous and partly inventive embodiments and further developments of the invention are shown in the subclaims and the subsequent description.

At least one embodiment of the invention is based on an existing fieldbus system or fieldbus system to be developed, which includes an at least three level hierarchy, in other words three cascade levels or orders of fieldbuses. This fieldbus system includes a first fieldbus (fieldbus of the first order). At least one second fieldbus (fieldbus of the second order) is subordinate to this first fieldbus. At least one third fieldbus (fieldbus of the third order) is in turn subordinate to this second fieldbus. The fieldbus system may herewith be branched in the manner of a tree, i.e. several fieldbuses of the second order and/or several fieldbuses of the third order.

Each of the fieldbuses includes a plurality of bus devices, which are referred to below as first, second or third bus devices, in accordance with their assignment to the first, second or third fieldbus. A bus device may in particular be an individual control device, an individual sensor or command giver, an individual actuator or a combination of several of these device types. Similarly, each bus device may be a compact device, at least in terms of hardware, with an unchangeable functionality or a modular device. In the latter case, the bus device includes several (physical) slots, which can be occupied with (hardware) modules of the same or varying function. These (hardware) modules are present in particular in the form of electronic slots. In addition or alternatively to the afore-described (hardware) modules, a bus device can contain a number of software modules which are delimited from one another and have specific functions in each instance. Each (hardware or software) module can in turn optionally be composed of one or several (sub) modules, which can in turn be designed to be modular.

For the project planning of the cascaded fieldbus system, the or each second fieldbus is in accordance with the invention connected to the first fieldbus via a fieldbus access point (FAP device). The FAP device herewith presents the devices of the second fieldbus as virtual modules of the first fieldbus.

Within the scope of at least one embodiment of the invention, the FAP device can optionally be an unchangeable, in hardware terms, compact device or a modular bus device. In the latter case, the FAP device contains at least one FAP module, in which the afore-described functionality is implemented.

Within the course of at least one embodiment of the inventive method, provision is further made for a bus device (subsequently referred to as "connecting device"), by way of which the third fieldbus is connected to the second fieldbus, to be presented as a virtual fieldbus access point module (virtual FAP module) of the first fieldbus. This virtual FAP module herewith presents the remaining devices of the third fieldbus as virtual modules of the first fieldbus.

The afore-described presentation of the bus devices of the subordinate fieldbuses as virtual modules of the first fieldbus is subsequently also referred to as "linearization" of the cascaded bus system.

The inventive linearization results in all bus devices of the subordinate fieldbuses in the field bus of the first order behaving as modules of this fieldbus. In particular, all bus devices and modules of the cascaded fieldbus system can thus be addressed and responded to directly via the fieldbus of the first order and, provided it permits the technical standard of the respective subordinate fieldbus, inherit all the functionalities which the FAP device or FAP module of the fieldbus of the first order makes available.

In particular, an if necessary existing modular structure of the bus devices of the subordinate fieldbuses is preferably also presented, by modules of any such bus device being presented on submodules of the respectively assigned virtual module.

The fieldbus of the first order is preferably a fieldbus of the second generation, in particular a fieldbus based on the "Profinet IO" standard. The subordinate fieldbuses can basically be based on any type of fieldbus standard. With at least one of these subordinate fieldbuses, in particular the fieldbus of the third order, this expediently concerns a fieldbus of the first generation, in particular a Profibus, CAN bus or Interbus. The inventive linearization of all bus devices of the cascaded fieldbus system is herewith advantageous in that the subordinate fieldbuses can also be responded to with the often highly developed and user-friendly functionalities of the fieldbus of the first order.

The inventive principle of the linearization of the subordinate fieldbus is preferably applied to any deeply cascaded fieldbus systems, i.e. to fieldbus systems with any number of orders of subordinate fieldbuses. In this sense, a fieldbus system is assumed, which, in addition to the afore-cited (first to third) fieldbuses, has at least one further fieldbus of the n'th order (with n=4, 5, 6, . . . ), which is directly or indirectly subordinate to the third fieldbus and which is directly or indirectly connected to the third fieldbus by way of a connecting device. Within the meaning of the inventive linearization of the fieldbus system, provision is herewith made for the connecting device connecting the further fieldbus of the n'th order to the next subordinate fieldbus to be presented as a virtual FAP module of the first fieldbus, so that the remaining bus devices (i.e. existing in addition to the connecting device) of the further fieldbus of the n'th order are presented as virtual modules of the first fieldbus.

The inventive fieldbus module or fieldbus device of at least one embodiment is generally set up to automatically implement at least one embodiment of the afore-described method. In particular, this fieldbus module or device is set up to present bus devices of the second fieldbus as virtual modules of the first fieldbus.

The inventive fieldbus module or device of at least one embodiment is also set up to present a connecting device, by way of which a third fieldbus can be connected to the second fieldbus, as a virtual FAP module of the first fieldbus and to present the remaining bus devices of the third fieldbus as virtual modules of the first fieldbus. The inventive fieldbus module of at least one embodiment is furthermore optionally also set up to linearize fieldbuses of the n'th order (with n=4, 5, 6, . . . ).

The inventive fieldbus module or device of at least one embodiment is in particular a FAP module or FAP device, by way of which a fieldbus of the second order can be connected to the fieldbus of the first order.

BRIEF DESCRIPTION OF THE DRAWINGS

An example embodiment of the invention is then explained in more detail with the aid of a drawing, in which.

Corresponding parts, variables and structures are always provided with the same reference characters in all the figures.

DETAILED DESCRIPTION OF THE EXAMPLE EMBODIMENTS

Figure 1:
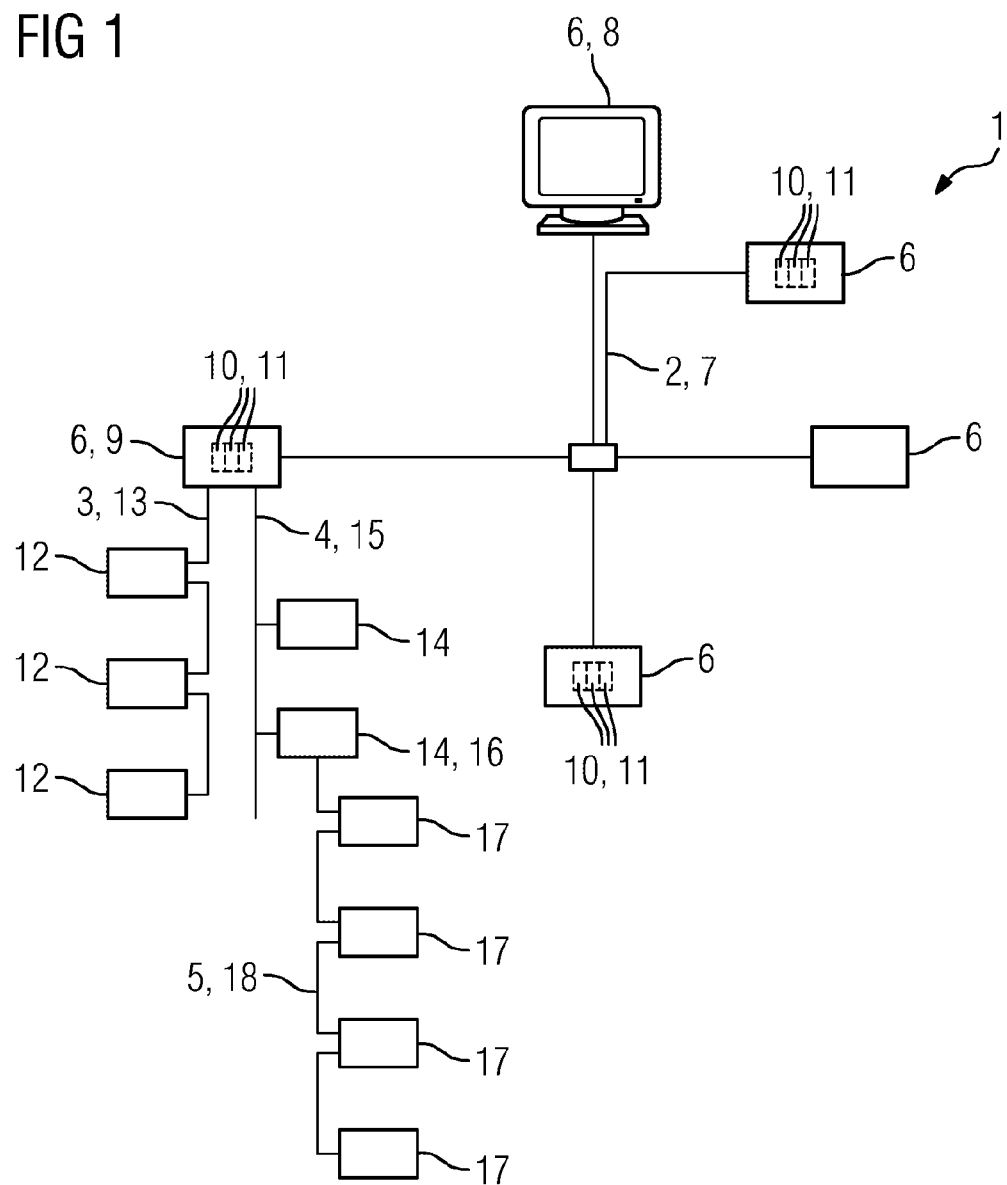
FIG. 1 shows a schematically simplified block diagram of a cascaded fieldbus system with a fieldbus of the first order, two fieldbuses of the second order, which are connected to the fieldbus of the first order by way of a fieldbus access point module (FAP module), and to a fieldbus of the third order, which is connected to one of the fieldbuses of the second order by way of a connecting device.

FIG. 1 shows a cascaded fieldbus system 1. The fieldbus system 1 includes a fieldbus of the first order, which is subsequently referred to as fieldbus 2, two fieldbuses of the second order, which are subsequently referred to as fieldbus 3 or fieldbus 4, and a fieldbus of the third order, which is subsequently referred to as fieldbus 5.

The dominant fieldbus 2 is based in particular on the "Profinet IO" standard. The subordinate fieldbuses 3 to 5 are in particular similar or different first generation fieldbuses. Therefore fieldbus 3 is based on the CAN standard, fieldbus 4 on the Profibus standard and fieldbus 5 on the Interbus standard.

Fieldbus 2 includes a number of bus devices 6, which are connected to one another by way of a shared bus line 7. The fieldbus 2 based on Ethernet transmission technology is generally a network of connected individual lines in the case of bus line 7, wherein the data transmission is communicated in the or each network node by a "hub" or "switch". The at least one of the bus devices 6 is a control device 8 (controller) which is operated in the fieldbus 2 as a master. Furthermore, at least one of the bus devices 6 is a FAP device 9, by way of which the fieldbuses 3 and 4 are directly connected to the fieldbus 2. The FAP device 9 is operated as a slave in fieldbus 2. Access by the FAP device 9 to the fieldbus 2 is thus controlled in particular by the control device 8. Within the scope of the subordinate fieldbuses 3 and 4, the FAP device 9 is by contrast preferably operated as a master in each instance.

The remaining bus devices 6 are at least predominantly input/output devices, which include in particular sensors or actuators, and which are operated within the scope of the fieldbus 2 as slaves. The fieldbus 2, in addition to the control device 8, can basically include at least one further control device, which is likewise operated as a master in the fieldbus 2.

One or several of the bus devices 6 is/are preferably designed to be modular. In this case the bus device 6 in question, as shown in FIG. 1, includes a number of (physical) slots 10, which can be occupied with modules 11 in the form of plug-in cards.

In addition to the FAP device 9, the fieldbus 3 also has a number of bus devices 12, wherein the bus devices 12 are connected to one another and to the FAP device 9 by way of a shared bus line 13.

Similarly, in addition to the FAP device 9, the fieldbus 4 also comprises a number of bus devices 14, wherein these devices 14 are connected to one another and to the FAP device 9 by way of a shared bus line 15. The bus devices 12 and 14 are at least predominantly input/output devices, which include actuators and/or sensors, and which are operated in the respective fieldbus 3 or 4 as slaves. One of the bus devices 14 of the fieldbus 4 is conversely a connecting device 16 (adapter device), by way of which the fieldbus 5 is connected to the fieldbus 4. The connecting device 16 is herewith operated in fieldbus 4 as a slave, in fieldbus 5 by contrast as a master.

In addition to the connecting device 16, the fieldbus 5 includes a number of further bus devices 17, wherein these bus devices 17 are connected to one another and to the connecting device 16 by way of a shared bus line 18. The bus devices 17 are preferably further input/output devices, in particular actuators and/or sensors, which are operated in the fieldbus 5 as slaves.

Provided the fieldbus standard of the respective subordinate fieldbuses 3-5 so permits, at least some of the bus devices 12, 14 and 17 can optionally be structured in a modular fashion.

Figure 2:
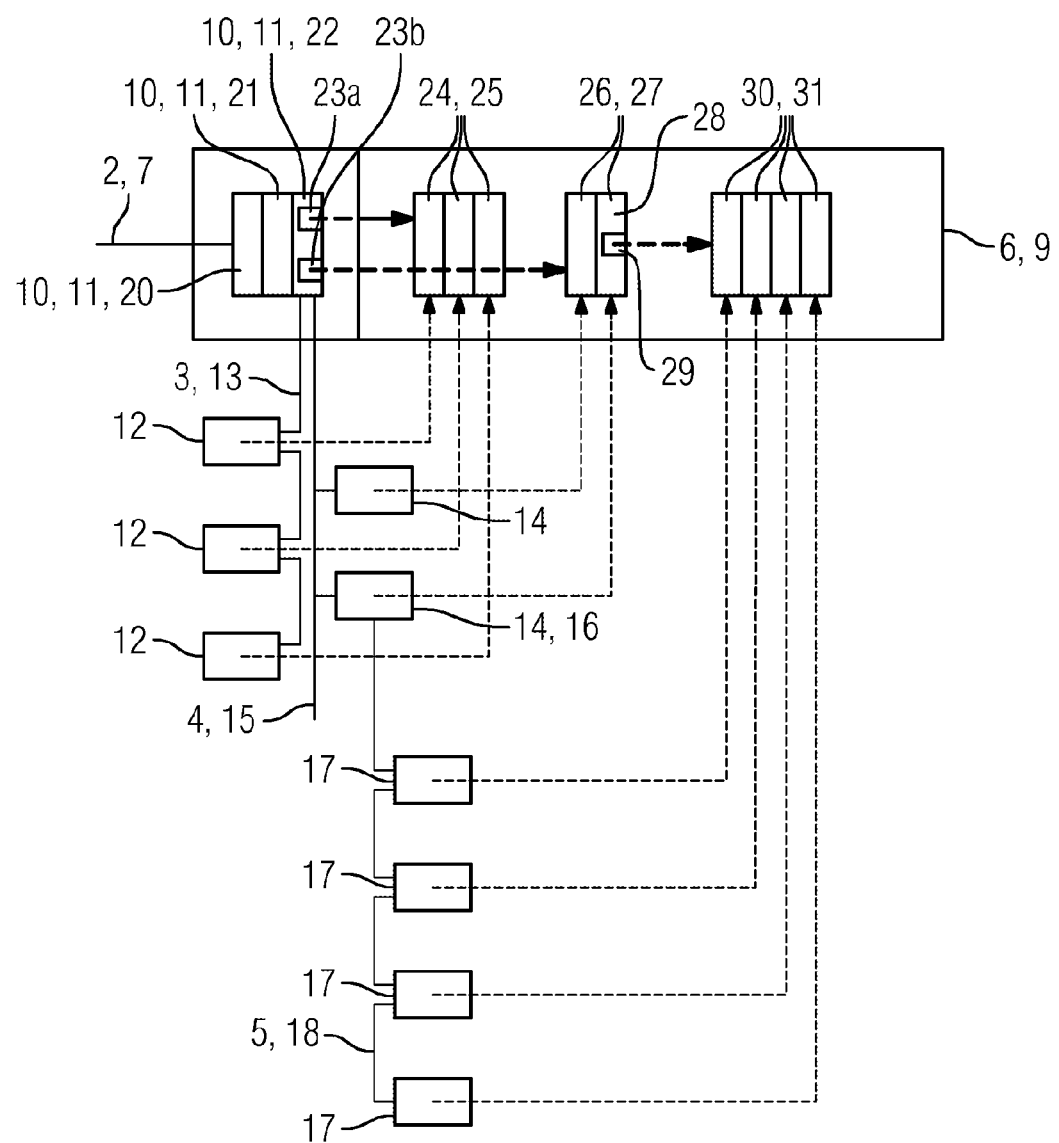
FIG. 2 shows a detailed representation of a bus device of the fieldbus of the first order containing the FAP module with the fieldbuses of the second and third order connected thereto.

FIG. 2 shows the FAP device 9 with the fieldbuses 3-5 connected directly or indirectly thereto in greater detail.

It is apparent from this representation that the FAP device 9, in the example embodiment, has three physical slots 10 populated with modules 11 in the form of plug-in cards. These modules 11 are for instance an interface module 20, which assumes the communication of the FAP device 9 within the fieldbus 2, an input/output module (subsequently IO module 21), which contains at least one sensor and/or actuator, and a FAP module 22, to which the fieldbuses 3 and 4 are connected.

The FAP module 22 includes in turn two FAP (sub) modules 23a and 23b integrated on a shared plug-in card.

The FAP module 23a is used here to integrate the fieldbus 3 into the address and communication scheme of the fieldbus 2. The FAP module 23a to this end defines a number of virtual slots 24 (also referred to as slot clusters), which can be addressed separately from the fieldbus 2. Each bus device 12 of the fieldbus 3 is herewith presented into a virtual module 25 of the fieldbus 2 by the FAP module 23a, wherein each virtual module 25 is assigned to one of the virtual slots 24. A virtual element is stored on each bus device 12 of the fieldbus 3 in the FAP module 23a, in other words in a software-specific manner, which in the address and communication scheme of the fieldbus 2, is treated as if the bus device 12 in question was a physical module of the fieldbus 2.

This results on the one hand in the data output by the bus device 12 to the fieldbus 3 being fed into the fieldbus 2 via the FAP module 23a and the associated virtual module 25, and on the other hand in the data and commands specific to the bus device 12 being routed out of the fieldbus 2 via the virtual module 25, the FAP module 23a and the fieldbus 3 to the bus device 12.

The associated bus device 12 of the fieldbus 3 can consequently be addressed in a similar manner to modules of one of the physical bus devices 6 by way of the virtual module 25. The translation between the address and communication scheme of the fieldbus 2 and the regularly deviating address and communication scheme of the fieldbus 3 is herewith assumed by the FAP module 23a or another component of the modular FAP device 9.

The FAP module 23b similarly communicates the data and control flow between the fieldbus 2 and the fieldbus 4, by it defining a number of further virtual slots 26 and presenting the bus devices 14 of the fieldbus 4 into virtual modules 27 of the fieldbus 2 assigned to these virtual slots 26.

The connecting device 16, by way of which the fieldbus 5 is connected to the fieldbus 4, is presented here by the FAP module 23b in a virtual FAP module 28 of the fieldbus 2.

The virtual FAP module 28 is a purely software-related reproduction of the physical FAP module 22 and has a functionality which corresponds to the latter. In particular, the virtual FAP module 28 includes a FAP (sub) module 29, which communicates the data and control flow between the fieldbus 2 and fieldbus 5 in the same way as the FAP (sub) modules 23a and 23b.

To this end, the FAP module 29 defines a number of further virtual slots 30 in the afore-described manner, presents the bus devices 17 of the fieldbus 5 in virtual modules 31 of the fieldbus 2 and in each case assigns one of the virtual modules 31 to one of the virtual slots 30.

As a result of this linearization process, all bus devices 12, 14 and 17 of the subordinate fieldbuses 3, 4 and 5 are presented as virtual modules 25 or 27 or 31 of the fieldbus 2. The bus devices 12, 14 and 17 of the subordinate fieldbuses 3, 4 and 5 are thus visible via the assigned virtual modules 25 or 27 or 31 in the address and communication scheme of the fieldbus 2 and can be addressed and responded to separately from this with regard to the, if necessary deviating, address and communication scheme of the fieldbuses 3, 4 and 5.

The FAP module 22 is herewith set up to linearize any depth of cascaded bus systems. It thus forms a connecting device, by way of which an, if necessary existing, fieldbus of the n'th order (n=4, 5, 6) is connected to the next subordinate fieldbus, as a virtual FAP module of the fieldbus 2. A number of virtual slots is in turn defined by a FAP submodule of this virtual FAP module. The bus devices of the fieldbus of the n'th order are presented in virtual modules of the fieldbus 2 by this FAP submodule, said modules in turn being assigned to a virtual slot.

The FAP module 22 is also set up to linearize modular bus devices of subordinate fieldbuses, by it presenting the modules of each modular bus device in corresponding submodules of the associated virtual modules of the field bus 2.

The formation of the virtual slots 24, 26, and 30 and the virtual modules 25, 27 and 31 usually takes place in particular according to the rules which are described in the guideline "Fieldbus Integration in PROFINET IO", Version 2.0 (May 3031), No. 7.012, PROFIBUS Nutzerorganisation e.V., Karlsruhe (Germany).

The subject matter of the invention is however not restricted to the afore-described example embodiment. Instead, further embodiments of the invention can be derived by the person skilled in the art from the claims and the preceding description.

The invention claimed is:

1. A method for the project planning of a cascaded fieldbus system including a first fieldbus, which includes a plurality of first bus devices, a second fieldbus subordinate to the first fieldbus and including a plurality of second bus devices, and a third fieldbus subordinate to the second fieldbus, which includes a plurality of third bus devices, the method comprising:
connecting the second fieldbus to the first fieldbus by way of a fieldbus access node device so that bus devices of the second fieldbus are presented as virtual modules of the first fieldbus;
presenting a connecting device, by way of which the third fieldbus is connected to the second fieldbus, as a virtual fieldbus access node module of the first fieldbus, a field access point (FAP) submodule of the virtual fieldbus access node module defining a number of virtual slots so that remaining bus devices of the third fieldbus are presented as virtual modules in virtual slots of the first fieldbus; and
assigning, via the FAP submodule, a respective virtual slot to each respective one of the virtual modules such that the virtual modules associated with the third fieldbus are assigned to respective ones of the virtual slots of the first fieldbus.

2. The method of claim 1, wherein the first fieldbus is based on an Ethernet standard.

3. The method of claim 1, wherein at least one of the second fieldbus and the third fieldbus is not based on an Ethernet standard.

4. The method of claim 1, wherein a further fieldbus is directly or indirectly subordinate to the third fieldbus, and wherein a connecting device, by way of which the further fieldbus is directly or indirectly connected to the third fieldbus, is presented as a virtual fieldbus access node module of the first fieldbus so that the remaining bus devices of the further fieldbus are presented as virtual modules of the first fieldbus.

5. A cascaded fieldbus system, comprising:
a first fieldbus, including a plurality of first bus devices;
a second fieldbus, subordinate to the first fieldbus and including a plurality of second bus devices; and
a third fieldbus, subordinate to the second fieldbus and including a plurality of third bus devices, the second fieldbus being connected to the first fieldbus via a fieldbus access node device, so that bus devices of the second fieldbus are presented as virtual modules of the first fieldbus; and
a connecting device, by which the third fieldbus is connected to the second fieldbus, presented as a virtual fieldbus access node module of the first fieldbus, remaining bus devices of the third fieldbus being presented as virtual modules in virtual slots of the first fieldbus and a virtual slot being respectively assigned to a respective one of the virtual modules such that the virtual modules associated with the third fieldbus are assigned to respective ones of the virtual slots of the first fieldbus.

6. The cascaded fieldbus system of claim 5, wherein the first fieldbus is based on an Ethernet standard.

7. The cascaded fieldbus system of claim 5, wherein at least one of the second fieldbus and the third fieldbus is not based on an Ethernet standard.

8. The cascaded fieldbus system of claim 5, wherein a further fieldbus is in turn directly or indirectly subordinate to the third fieldbus, wherein a connecting device, by way of which the further fieldbus is directly or indirectly connected to the third fieldbus, is presented as a virtual fieldbus access node module of the first fieldbus so that remaining modules of the further fieldbus are presented as virtual modules of the first fieldbus.

9. A fieldbus access node module for connecting a subordinate second fieldbus to a dominant first fieldbus, the fieldbus access node module being set up to present bus devices of the subordinate second fieldbus as virtual modules of the dominant first fieldbus, the fieldbus access node module being further set up to present a connecting device, by which a third fieldbus is connectable to the subordinate second fieldbus, as a virtual fieldbus access node module of the dominant first fieldbus and to present remaining bus devices of the third fieldbus as virtual modules of the dominant first fieldbus, a respective virtual slot being assigned to a respective one of the virtual modules by a field access point (FAP) submodule of the virtual fieldbus access node module such that the virtual modules associated with the third fieldbus are assigned to respective ones of the virtual slots of the first fieldbus.

10. A fieldbus access point for connecting a subordinate second fieldbus to a dominant first fieldbus, the fieldbus access point being set up to present bus devices of the subordinate second fieldbus as virtual modules of the dominant first fieldbus, the fieldbus access point being further set up to present a connecting device, by which a third fieldbus is connectable to the subordinate second fieldbus, as a virtual fieldbus access node module of the dominant first fieldbus and to present remaining bus devices of the third fieldbus as virtual modules of the dominant first fieldbus, a virtual slot being assigned by a field access point (FAP) submodule of the virtual fieldbus access node module such that the virtual modules associated with the third fieldbus are assigned to respective ones of the virtual slots of the first fieldbus.

11. The method of claim 2, wherein at least one of the second fieldbus and the third fieldbus is not based on an Ethernet standard.

12. The method of claim 2, wherein a further fieldbus is directly or indirectly subordinate to the third fieldbus, and wherein a connecting device, by way of which the further fieldbus is directly or indirectly connected to the third fieldbus, is presented as a virtual fieldbus access node module of the first fieldbus so that the remaining bus devices of the further fieldbus are presented as virtual modules of the first fieldbus.

13. The method of claim 3, wherein a further fieldbus is directly or indirectly subordinate to the third fieldbus, and wherein a connecting device, by way of which the further fieldbus is directly or indirectly connected to the third fieldbus, is presented as a virtual fieldbus access node module of the first fieldbus so that the remaining bus devices of the further fieldbus are presented as virtual modules of the first fieldbus.

14. The cascaded fieldbus system of claim 6, wherein at least one of the second fieldbus and the third fieldbus is not based on an Ethernet standard.

15. The cascaded fieldbus system of claim 6, wherein a further fieldbus is in turn directly or indirectly subordinate to the third fieldbus, wherein a connecting device, by way of which the further fieldbus is directly or indirectly connected to the third fieldbus, is presented as a virtual fieldbus access node module of the first fieldbus so that remaining modules of the further fieldbus are presented as virtual modules of the first fieldbus.

16. The cascaded fieldbus system of claim 7, wherein a further fieldbus is in turn directly or indirectly subordinate to the third fieldbus, wherein a connecting device, by way of which the further fieldbus is directly or indirectly connected to the third fieldbus, is presented as a virtual fieldbus access node module of the first fieldbus so that remaining modules of the further fieldbus are presented as virtual modules of the first fieldbus.

* * * * *